(12) United States Patent
Kumano

(10) Patent No.: US 7,054,125 B2
(45) Date of Patent: May 30, 2006

(54) X-RAY PROTECTOR

(75) Inventor: Mitsuo Kumano, Takefu (JP)

(73) Assignee: Orion Electric Co., Ltd., Fukui (JP)

( * ) Notice: Subject to any disclaimer, the term of this patent is extended or adjusted under 35 U.S.C. 154(b) by 348 days.

(21) Appl. No.: 10/419,117

(22) Filed: Apr. 21, 2003

(65) Prior Publication Data
US 2003/0197990 A1    Oct. 23, 2003

(30) Foreign Application Priority Data
Apr. 19, 2002    (JP) .............................. 2002-117888

(51) Int. Cl.
*H02H 3/20* (2006.01)
(52) U.S. Cl. ..................... 361/91.1; 348/378
(58) Field of Classification Search .............. 361/91.1; 348/377, 378
See application file for complete search history.

(56) References Cited

U.S. PATENT DOCUMENTS

| | | | | |
|---|---|---|---|---|
| 4,234,793 A | * | 11/1980 | Amtmann | 378/118 |
| 4,601,051 A | * | 7/1986 | Santurtun et al. | 378/118 |
| 4,641,330 A | * | 2/1987 | Herwig et al. | 378/101 |
| 5,187,737 A | * | 2/1993 | Watanabe | 378/105 |
| 5,430,596 A | * | 7/1995 | Hamaguchi et al. | 361/86 |
| 5,561,578 A | | 10/1996 | Shimoyanagida | 361/91 |
| 6,057,999 A | * | 5/2000 | Park et al. | 361/91.1 |
| 6,075,687 A | * | 6/2000 | Cheng et al. | 361/91.1 |
| 6,268,665 B1 | * | 7/2001 | Bobry | 307/66 |
| 6,282,071 B1 | * | 8/2001 | Jackson | 361/86 |
| 6,593,684 B1 | * | 7/2003 | Makita et al. | 313/407 |
| 6,757,356 B1 | * | 6/2004 | Yagi | 378/118 |
| 6,885,531 B1 | * | 4/2005 | Tang | 361/93.1 |

FOREIGN PATENT DOCUMENTS

| | | |
|---|---|---|
| JP | 2-230871 | 9/1990 |
| JP | 5-137018 | 6/1993 |
| JP | 6-319053 | 11/1994 |
| JP | 7-327144 | 12/1995 |

* cited by examiner

*Primary Examiner*—Brian Sircus
*Assistant Examiner*—James A. Demakis
(74) *Attorney, Agent, or Firm*—Wenderoth, Lind & Ponack, L.L.P.

(57) ABSTRACT

The present X-ray protector requires no raising of a voltage to be impressed to a cathode ray tube (CRT) and no complicated control procedure for testing the X-ray protector's operation. The voltage applied to the CRT is detected by a detection winding of a flyback transformer and a detection circuit. An input line, which includes a resistor inputs a signal based on the detected voltage to a microcomputer. The microcomputer controls whether a transistor is conductive or unconductive. An emitter of the transistor is connected to one terminal of the resistor, and a collector is connected to the other terminal of the resistor. When the transistor is conductive both ends of the resistor are short-circuited causing the electric voltage of a signal input to the microcomputer to be raised, thereby enabling testing of the X-ray protector without the need to apply a higher than normal voltage to the CRT.

3 Claims, 3 Drawing Sheets

X-RAY PROTECTOR

BACKGROUND OF THE INVENTION

1. Field of the Invention

The present invention relates to an X-ray protector that turns a power supply circuit OFF when a voltage exceeding a preset voltage is applied to a Braun tube, i.e., a cathode ray tube (CRT), of a TV receiver.

2. Prior Art

FIG. 3 is a block diagram showing one example of a circuit including a prior art X-ray protector of a TV receiver. In the figure, reference numeral 32 depicts a connection plug to be connected to an AC power source, and reference numeral 35 depicts a power supply circuit that supplies electric power in order to operate a Braun tube 38, i.e., CRT. In addition, a relay circuit 33 is connected between the plug 32 and an input terminal of the power supply circuit. The relay circuit 33 is arranged to be turned ON or OFF by an input of a control signal output from a microcomputer 31.

The electric power output from the power supply 35 is input to a primary winding of a flyback transformer 36, and a voltage in proportion to a voltage applied to the primary winding is induced in a high-voltage winding, and the voltage in the high-voltage winding is rectified to be positive potential and pulsed shape and is applied to the Braun tube 38. Furthermore, a voltage in proportion to the voltage applied to the Braun tube 38 is induced in a detection winding. After that, a signal based on the voltage generated in the detection winding is input, via a detection circuit 39, to an input port 31a of the microcomputer 31 so that the voltage applied to the Braun tube 38 can be determined by the microcomputer 31.

In the above-described X-ray protector, when a voltage exceeding a predetermined voltage is applied to the Braun tube 38 for some reason or other, the microcomputer 31 determines that situation through the signal input to the input port 31a and turns the relay circuit 33 OFF, thereby preventing an emission of X-rays exceeding a permissible dose caused by the situation where a voltage higher than a predetermined voltage is continued to be applied to the Braun tube 38.

In an assembly process of such as a TV receiver or the like, the test of the X-ray protector operation is usually conducted in order to determine whether an X-ray protector functions normally or not. When conducting such an operation test, an output voltage of the power supply 35 is adjusted so that a voltage exceeding a voltage in the case of normal operation is applied to the Braun tube 38, and then the test is conducted as to whether the microcomputer 31 can function to turn the relay circuit 33 OFF normally.

However, the applying of an excessive voltage exceeding a voltage applied to normally operate a Braun tube causes generation of X-rays exceeding a permissible dose from a Braun tube, and this is not preferable for the workers of this test in view of their health. Further, a Braun tube can be damaged by the application of the excessive voltage.

On the other hand, a test of an X-ray protector's operation may be conducted without raising the voltage to be applied to a Braun tube. In this case, comparison standard data for testing are set in a microcomputer, whereby a relay circuit can be turned OFF depending on the basis of the comparison between the comparison standard data and a detection value of the voltage to a Braun tube. However, in order to operate the relay circuit on the basis of the detection value derived from the testing by setting comparison standard data for testing in a microcomputer, it is inevitable that a control procedure for testing utilizing a microcomputer becomes complicated, thereby complicating a control program of a microcomputer.

SUMMARY OF THE INVENTION

It is, therefore, an object of the present invention to provide an X-ray protector that does not require raising a voltage to be applied to a Braun tube, i.e., CRT, and does not require a complicated control procedure for testing at the time of conducting a test of an X-ray protector operation.

In order to attain the above object, the X-ray protector according to the present invention is comprised of:

a high-voltage detection means for detecting a voltage to be applied to a Braun tube of a TV receiver;

a control means for controlling to turn OFF a power supply circuit for supplying an electric power to operate the Braun tube on the basis of a detection signal input to an input port of the control means; and an input line for inputting detection signals based on the voltage detected by the high-voltage detection means to an input port of the control means;

wherein the X-ray protector operation in order to turn OFF the power supply circuit is commenced when a voltage equal to or higher than a predetermined voltage corresponding to a permissible dose of X-rays emitted from the Braun tube is applied to the Braun tube;

and further comprised of a resistor connected to the input line in series and a short-circuit means for short-circuiting both ends of the resistor so as to test the X-ray protector operation by short-circuiting both ends of the resistor through the short-circuit means.

As such, according to the X-ray protector in the present invention, a test of the X-ray protector operation can be conducted without applying an excessive voltage, which is higher than a voltage applied to normally operate the Braun tube. As a result, when testing the X-ray protector operation, an emission of X-rays exceeding a permissible dose can be avoided and the Braun tube can be protected from getting damaged.

Further, according to the X-ray protector in the present invention, when testing the X-ray protector operation, there is no need to set the comparison standard data for testing, so that the control program does not become complicated and therefore the resultant control procedure does not become complicated.

In addition, the short-circuit means may be constituted to be short-circuited at the time when a predetermined control signal is output from the control means and the path between terminals connected to both ends of the resistor becomes electrically conductive.

Thus, testing the X-ray protector operation by short-circuiting the short-circuit means can be made, without necessitating a test operator's man-made operation for the short-circuit means, in a simple manner unified by the control means.

Besides, the short-circuit means may be constituted of a semiconductor element whose electric conductive state is controlled by a signal output from the control means. With such an arrangement, the short-circuit means can be made simple. Further, when testing the X-ray protector operation, the control of the short-circuit means can be conducted easily by signals output from the control means.

BRIEF DESCRIPTION OF THE DRAWINGS

For a better understanding of the invention, reference is made to the accompanying drawings, in which.

DETAILED DESCRIPTION OF THE PREFERRED EMBODIMENTS

Figure 1:
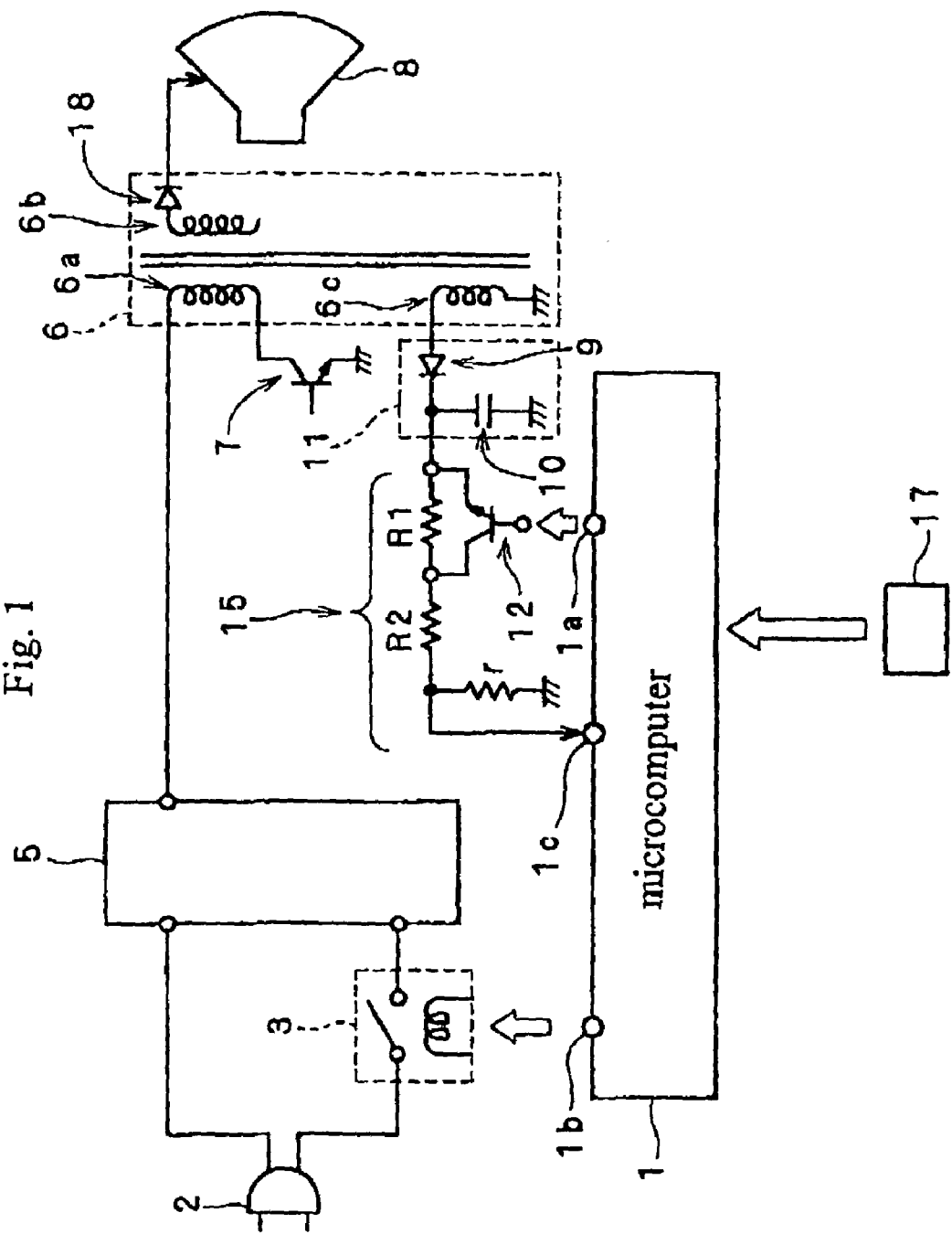
FIG. 1 is a block diagram showing the circuit of the X-ray protector according to the present invention.

An embodiment of the present invention will be described with reference to the accompanying drawings. FIG. 1 is a block diagram showing a circuit of a TV receiver including the X-ray protector according to the present invention. In the FIG. 1, numeral 5 depicts a power supply circuit that supplies electric power for operating a TV receiver and a Braun tube 8, i.e., cathode ray tube (CRT). The power supply circuit 5 is connected, via a connection plug 2, to an AC power source and receives electric power.

A relay circuit 3 is provided between the connection plug 2 and an input side of the power supply circuit 5. The relay circuit 3 is arranged to be turned ON/OFF depending on a control signal that is output by a microcomputer 1, which will be explained hereunder, through its second signal output port 1b. When the relay circuit 3 is turned ON, electric power is supplied to the power source circuit 5 from the AC power source. On the other hand, when the relay circuit 3 is turned OFF, the supply of electric power to the power supply circuit 5 is stopped.

Besides, in FIG. 1, numeral 6 depicts a flyback transformer, which is provided with a primary winding 6a, a high-voltage winding 6b, and a detection winding 6c. An input side of the primary winding 6a of the flyback transformer 6 is connected to an output terminal of the power supply circuit 5, while a terminating side thereof is connected to a pulse-voltage generating transistor 7.

In the pulse-voltage generating transistor 7, its conductive state and unconductive state are controlled by a control signal from a control circuit, which is not shown in figures, and, depending on the resultant control, the pulse-voltage generating transistor 7 controls the conduction of the primary winding 6a. Thus, a pulsed voltage comprised of only a positive electric potential, which is obtained by rectifying an AC electric power input from the power supply circuit 5, is applied by the operation of the transistor 7 to the primary winding 6a of the flyback transformer 6.

A high voltage is induced in the primary winding 6b of the flyback transformer 6 in proportion to the voltage and the winding ratio of the primary winding 6a. The high voltage induced in the high-voltage winding 6b is applied, via a diode 18, to the Braun tube 8, thereby enabling the Braun tube 8 to operate. An anode of the diode 18 is connected to the side of the high-voltage winding 6b, and a cathode of the diode 18 is connected to the side of the Braun tube 8.

In the Braun tube 8, electron beams are accelerated due to the high voltage applied by the high-voltage winding 6b. The accelerated electron beams are impacted to phosphors so as to make it luminous, thereby forming video pictures. When electron beams impact the phosphors, X-rays are emitted. The X-ray dose to be emitted is restricted by laws and the permissible dose is ruled. And in operating the Braun tube 8, in order to emit X-rays less than or equal to the permissible dose, the power supply circuit 5, the flyback transformer 6, and the like are adjusted so that the voltage of the high-voltage winding 6b is less than or equal to a predetermined voltage value.

In the circuit of the FIG. 1, a reduced voltage is induced in the detection winding 6c of the flyback transformer 6 in proportion to the voltage and the winding ratio of the high-voltage winding 6b. As such, by detecting the voltage induced in the detection winding 6c, the high voltage of the high-voltage winding 6b, i.e., a voltage to be applied to the Braun tube 8 can be detected.

Further referring to the FIG. 1, numeral 11 depicts a detection circuit, which is constituted of a diode 9 and a condenser 10. An anode of the diode 9 is connected to the side of the detection winding 6c, and a cathode of the diode 9 is connected to the side of an input line 15. One terminal of the condenser 10 is connected to a cathode of the diode 9 and the side of the input line 15, while the other terminal of the condenser 10 is connected to ground. In the detection circuit 11, a voltage of the detection winding 6c is rectified to be a direct current voltage as a detection voltage. Thereafter, the detection voltage is transmitted to the side of the input line 15.

The detecting winding 6c and the detection circuit 11 above-described function as a high voltage detection means that detects a high voltage applied to the Braun tube 8.

The input line 15 inputs a signal corresponding to the detection voltage from the detection circuit 11 to an X-ray protector input port 1c (hereinafter referred to as an input port 1c). The input line 15 is connected with resistors R1 and R2 in series. Further, a resistor r is connected to the input line 15 at the portion located near the portion where the input line 15 is connected to the input port 1c of the microcomputer 1, and is connected to the ground.

The above resistors R1, R2, and r are voltage dividing resistors that divide a detection voltage from the detection circuit 11, and an electric voltage formed by the resistor r is input, as a detection signal, to the input port 1c.

Further, in parallel with the resistor R1, a transistor 12 for a short-circuiting is connected. An emitter terminal of the transistor 12 is connected to one terminal of the resistor R1, while a collector terminal is connected to the other terminal of the resistor R1. A base terminal of the transistor 12 is connected to the first control signal output port 1a of the microcomputer 1, and an operation control signal is input from the microcomputer 1 to the transistor 12. Thus, whether the transistor 12 is conductive or unconductive depends on the control by the microcomputer 1.

When an operation signal is input from the microcomputer 1 to the base terminal of the transistor 12, the path between the emitter terminal and the collector terminal becomes conductive, then both ends of the resistor R1 are short-circuited by the transistor 12. The transistor 12 is a short-circuit means for short-circuiting the both ends of the resistor R1.

When the transistor 12 is in a unconductive state, i.e., when the both ends of the resistor R1 are not short-circuited, the electric voltage of a detection signal input to the input port 1c of the microcomputer 1 is determined depending on a detection voltage input to the input line 15 and resistors R1, R2 and r.

On the other hand, when the transistor 12 is turned into a conductive state, namely, when the both ends of the resistor R1 are short-circuited, the electric voltage of a detection signal input to the input port 1c of the microcomputer 1 is determined depending on a detection voltage input to the input line 15 and resistors R2 and r.

Therefore, provided that a detection voltage having an identical voltage value is input to the input line 15, when the resistor R1 is short-circuited by the transistor 12, the electric voltage input to the input port 1c is larger than the case where the resistor R1 is not short-circuited by the transistor 12.

The microcomputer 1 shown in FIG. 1 corresponds to a control means and is provided with an operation section and a memory section, which are not shown in figures, in order to control the operation of the X-ray protector. When an electric voltage input to the input port 1c becomes higher than or equal to a predetermined value, the relay circuit is turned OFF in order to stop an electric power supply to the power supply circuit 5.

The microcomputer 1 is equipped with a control program for controlling the operation of the X-ray protector. In the control program incorporated in the microcomputer 1, a predetermined value is set as a standard for determining whether the operation of the X-ray protector should be implemented. In this case, the microcomputer 1 is arranged to be able to compare data about detection signals input to the input port 1c with a predetermined value as a standard for determining whether the operation of the X-ray protector should be implemented.

Further, in accordance with the control program, the microcomputer 1 outputs control signals to the first control signal output port 1a and the second control signal output port 1b through its internal data-bus, thereby controlling the transistor 12 and the relay circuit 3.

Besides, in the X-ray protector according to the present invention, the microcomputer 1 is connected to a remote controller 17, so that a test operator can control the microcomputer 1 by operating the remote controller 17. Further, by operating the remote controller 17, a TV receiver can be actuated, and the test of the X-ray protector operation can be conducted. And, the control program incorporated in the microcomputer 1 judges instructions of the remote controller 17.

In the aforementioned short-circuit means of the X-ray protector, either a NPN transistor or a PNP transistor may be applied as the transistor 12. Further, instead of the transistor 12, a FET (Field-Effect transistor) may be applied. In a case where such a FET is applied, a gate terminal thereof is connected to the first control signal output port 1a of the microcomputer 1, and a drain terminal and a source terminal are connected to the both ends of the resistor R1, respectively.

Other than the aforementioned transistors and a FET, any kind of semiconductor element, which can control an electric conductive state and a unconductive state by inputting control signals to a control terminal, may be applied to the short-circuit means. When the short-circuit means is constituted of semiconductors such as transistors, the short-circuit means can be made compact, and, in conducting the testing of the X-ray protector operation, controlling the short-circuit means by signals of the microcomputer 1 can be made easily.

Besides, such short-circuit means can be constituted by a relay circuit. In this case, the relay circuit, which constitutes a short-circuit means, is turned ON by control signals from the first control signal output port 1a of the microcomputer 1, thereby short-circuiting the both ends of the resistor R1.

When a short-circuit means for short-circuiting the resistor R1 is constituted of circuit elements, which can be controlled by control signals from the microcomputer 1, such as the above semiconductor elements including transistors and a relay circuit, the X-ray protector operation can be conducted easily under the unified condition by the microcomputer 1.

Further, a short-circuit means is not limited to the aforementioned one, wherein the both ends of the resistor R1 are short-circuited automatically by signals from the microcomputer 1, and the one that is constituted so as to be turned ON/OFF mechanically with the hands of a test operator may be applicable.

As already explained, the high-voltage detection means according to the present invention is constituted of the detection winding 6c of the flyback transformer 6. By using the flyback transformer 6, the primary winding 6a and the high-voltage winding 6b, both of which are used for applying a high voltage to the Braun tube 8, and the detection winding 6c constituting the high voltage detection means can be unified. Thus, a TV receiver as a whole can be made compact.

On the other hand, the flyback transformer 6 is not necessarily used. In short, a high-voltage detection means for detecting a high voltage applied to the Braun tube 8 is needed.

According to the X-ray protector as explained heretofore, when the voltage of the high-voltage winding 6b rises for some reason or other while a TV receiver is operating, responding to it, the electric voltage of the detection winding 6c rises and a detection voltage rises. As a result, when it is determined that the electric voltage of the detection signal, which is input from the input line 15 to the input port 1c of the microcomputer 1, is higher or equal to a predetermined value set as a standard for the operation of the X-ray protector, a control signal is output from the second control signal output port 1b to the relay circuit 3, and the relay circuit 3 is turned OFF. Thus, supplying an electric power to the power supply circuit 5 is stopped, and the operation of a TV receiver is stopped.

Next, operation examples of the above-described X-ray protector will be explained.

Figure 2:
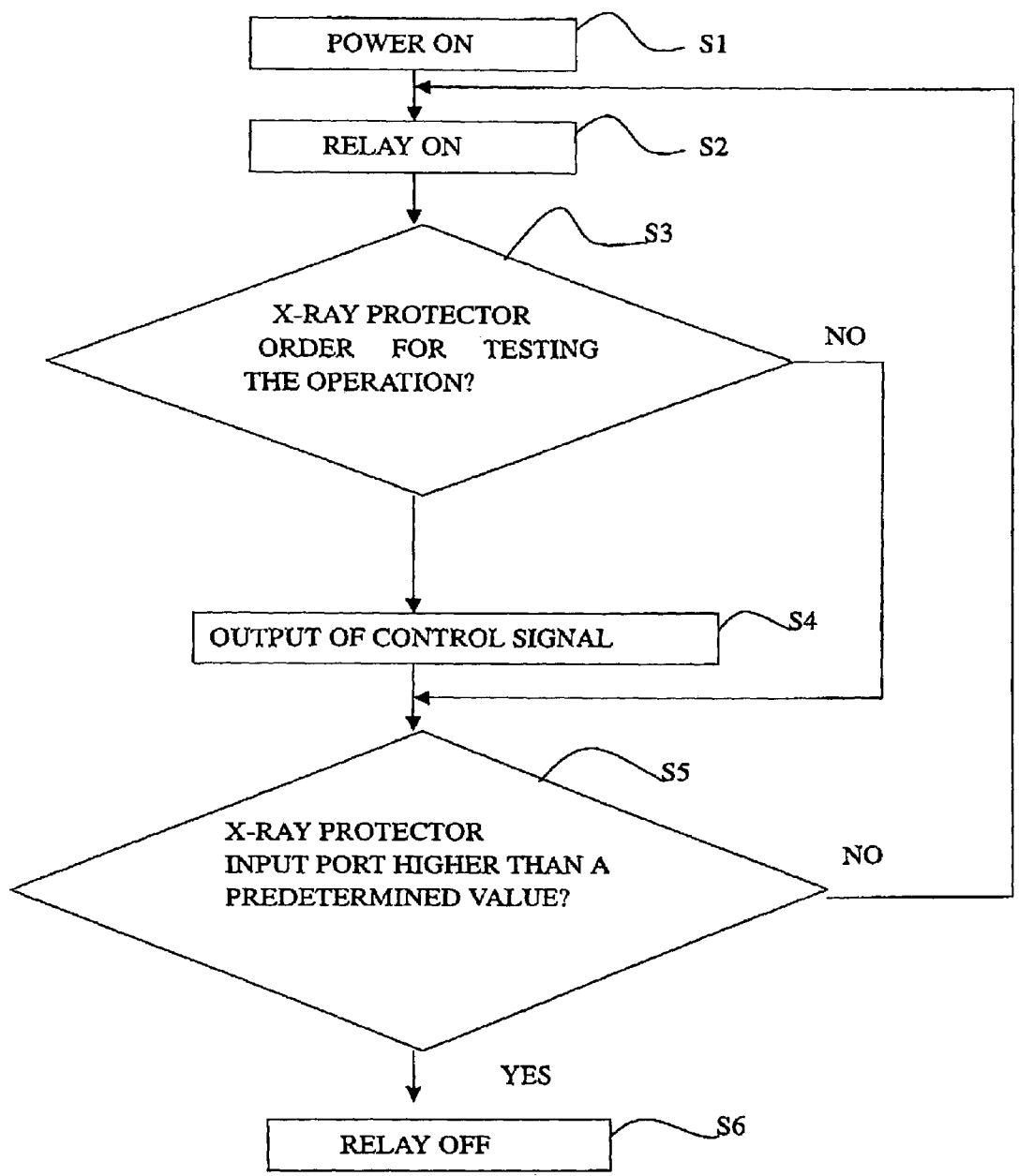
FIG. 2 is a flow chart showing the steps of the sequence of the X-ray protector's operation.
Figure 3:
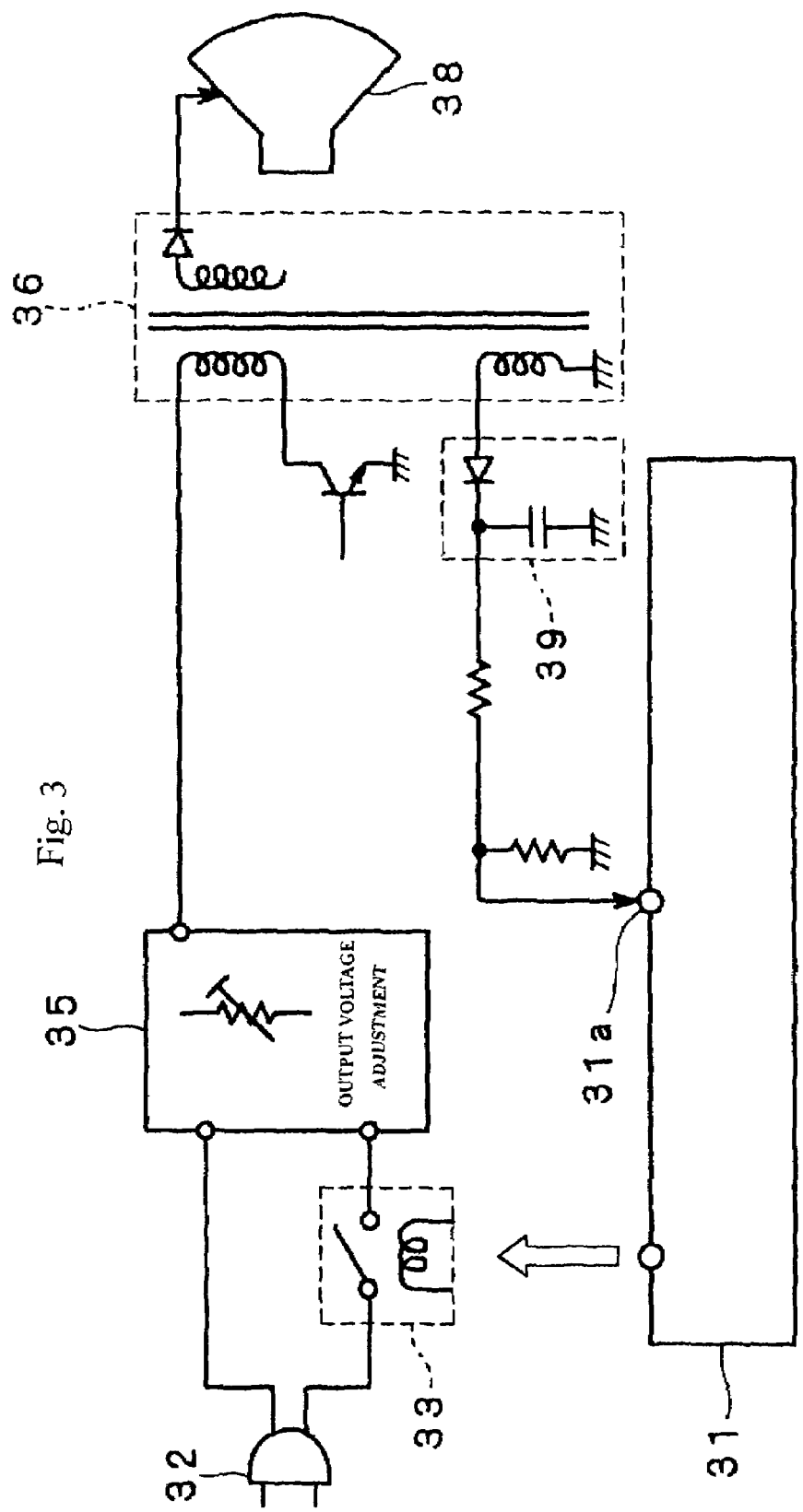
FIG. 3 is a block diagram showing a circuit of a conventional X-ray protector.

First of all, the connection plug 2 is connected to an AC power source for enabling a TV receiver to operate. Then, a test operator operates the remote controller 17 in order to make the TV receiver power-on. In this way, the microcomputer 1 starts implementing the control program. FIG. 2 is a flow chart showing the operation procedures based on the contents of the control program. Hereunder, explanation will be made on the basis of FIG. 2. Due to the operation to make the TV receiver power-on by the remote controller 17, implementing of the control program starts, and the order "power-on" from the remote controller 17 is read into the microcomputer 1 (S1).

Next, the relay circuit 3 is ordered to be turned ON (S2), and an operation signal to turn the relay circuit 3 ON is output from the second control signal output port 1b of the microcomputer 1, thereby turning the relay circuit 3 ON. Thus, an electric power is supplied from an AC power supply to the power source circuit 5, and a high voltage is applied to the Braun tube 8 so as to commence to operate.

Further, the microcomputer 1 determines as to whether or not the order for testing the X-ray protector operation is output from the remote controller 17 (S3), and when a test operator operates the remote controller 17 in order to output the order for testing the X-ray protector's operation (S3; YES), a control signal is output from the first control signal output port 1a (S4). Thus, the transistor 12 becomes conductive, and the both ends of the resistor R1 are short-circuited, whereby an electric voltage to be input to the input port 1c is raised.

Next, the microcomputer 1 determines as to whether or not the electric voltage input to the input port 1c is higher than or equal to a predetermined value (S5). In case where the voltage input to the input port 1c is higher than or equal to the predetermined value (S5: YES), the order to turn the relay circuit OFF is implemented (S6), and a control signal for turning the relay circuit 3 OFF is output from the second control signal output port 1b of the microcomputer 1. Thus, supplying an electrical power to the power supply circuit 5 is stopped, and the operation of the Braun tube 8 is stopped. And the test operator can confirm that the X-ray protector was properly operated, with confirming that the operation of the Braun tube 8 was stopped.

In the step of S3, when the microcomputer 1 determines that the order for testing the operation of the X-ray protector is not output to it (S3: NO), the step of S4 is not implemented and the step of S5 and the following thereto are implemented. Such an operation, in which the testing of the X-ray protector operation is not implemented (S3: NO) and the steps S5 and S6 are implemented so as to make the power supply circuit 5 OFF, is the X-ray protector operation.

On the other hand, at the step S5, in the case where the electric voltage input to the input port 1c of the microcomputer 1 is higher than or equal to the predetermined value (S5: NO), the relay 3 is kept ON-state and the sequence transfers to the step S2 and the steps following thereto.

According to the X-ray protector in the present invention as explained heretofore, the resistor R1 is provided in series to the input line 15 that inputs the detection voltage, which is detected depending on the voltage of the Braun tube 8, to the microcomputer 1. And by short-circuiting the resistor R1, the voltage of signals input to the microcomputer 1 is raised, thereby enabling the testing of the operation of the X-ray protector.

Therefore, in conducting the test of the operation of the X-ray protector, it is not required to apply an excessive voltage higher than the voltage to normally operate the Braun tube 8, so that an emission of X-rays exceeding a permissible dose is not generated and the Braun tube 8 does not get damaged.

Further, according to the X-ray protector in the present invention, it is not required to set, in addition to a predetermined value as a criterion for performing the primary operation of the X-ray protector, a comparison standard data in order to conduct the testing of the X-ray protector operation. Thus, the control program does not become complicated and the control procedures also do not become complicated.

As explained heretofore, according to the X-ray protector in the present invention, in conducting the test of the operation of the X-ray protector, there exist effects such that an emission of X-rays exceeding a permissible dose is not generated, and that a Braun tube does not get damaged. Further, the X-ray protector in the present invention has an effect such that the control procedures for conducting the test of the operation of the X-ray protector do not become complicated.

What is claimed is:

1. An X-ray protector for use with a CRT of a TV receiver, said X-ray protector comprising:
    a power supply circuit operable to supply electrical power to the CRT;
    a high-voltage detector operable to detect a voltage to be applied to the CRT;
    an input line;
    a controller, having an input port to which the input line inputs a detection signal based on the voltage detected by the high-voltage detector, operable to turn off the power supply circuit based on the detection signal;
    a resistor connected to said input line in series; and
    a short-circuit device operable, during testing of the X-ray protector, to short-circuit both ends of said resistor so as to raise the voltage of the detection signal;
    wherein said controller is operable to:
        turn off said power supply circuit when a voltage greater than or equal to a predetermined voltage is applied to the CRT, the predetermined voltage corresponding to a voltage that would cause the CRT to produce a permissible dose of X-rays; and
        test the X-ray protector by receiving, through the input port of the controller, the raised-voltage detection signal produced by said short-circuit device, without applying an excessive voltage, which is higher than a normally-applied voltage, to the CRT.

2. An X-ray protector according to claim 1, wherein
    said controller is operable to output a predetermined signal to said short-circuit device; and
    said short-circuit device is operable to short circuit said resistor by making a path between the ends of said resistor electrically conductive when the predetermined signal is output by said controller.

3. An X-ray protector according to claim 2, further comprising a remote controller operable to control functions of said controller including testing of the X-ray protector.

* * * * *